US 10,570,765 B2

(12) United States Patent
Propheter-Hinckley

(10) Patent No.: US 10,570,765 B2
(45) Date of Patent: Feb. 25, 2020

(54) ENDWALL ARC SEGMENTS WITH COVER ACROSS JOINT

(71) Applicant: United Technologies Corporation, Farmington, CT (US)

(72) Inventor: Tracy A. Propheter-Hinckley, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 618 days.

(21) Appl. No.: 15/353,931

(22) Filed: Nov. 17, 2016

(65) Prior Publication Data

US 2018/0135451 A1   May 17, 2018

(51) Int. Cl.
| | | |
|---|---|---|
| *F01D 11/00* | (2006.01) | |
| *F01D 9/04* | (2006.01) | |
| *F04D 29/54* | (2006.01) | |
| *F04D 29/56* | (2006.01) | |
| *F01D 17/16* | (2006.01) | |
| *F01D 25/00* | (2006.01) | |
| *F04D 29/08* | (2006.01) | |
| *F02C 3/04* | (2006.01) | |

(52) U.S. Cl.
CPC ............ *F01D 11/005* (2013.01); *F01D 9/041* (2013.01); *F01D 17/162* (2013.01); *F01D 25/005* (2013.01); *F02C 3/04* (2013.01); *F04D 29/083* (2013.01); *F04D 29/542* (2013.01); *F04D 29/563* (2013.01); *F05D 2220/32* (2013.01); *F05D 2240/128* (2013.01); *F05D 2240/35* (2013.01); *F05D 2240/55* (2013.01); *F05D 2300/20* (2013.01); *F05D 2300/6033* (2013.01)

(58) Field of Classification Search
CPC .... F01D 11/005; F01D 11/006; F01D 11/008; F01D 9/041; F01D 17/162; F04D 29/563; F04D 29/542; F04D 29/083; F02C 3/04
See application file for complete search history.

(56) References Cited

U.S. PATENT DOCUMENTS

| | | |
|---|---|---|
| 3,215,511 A | 11/1965 | Chisholm |
| 4,137,008 A | 1/1979 | Grant et al. |

(Continued)

FOREIGN PATENT DOCUMENTS

| | | |
|---|---|---|
| EP | 0764764 | 3/1997 |
| EP | 1764481 | 3/2007 |

(Continued)

OTHER PUBLICATIONS

European Search Report for European Patent Application No. 17202442 completed Mar. 15, 2018.

(Continued)

*Primary Examiner* — Eldon T Brockman
(74) *Attorney, Agent, or Firm* — Carlson, Gaskey & Olds, P.C.

(57) ABSTRACT

An article includes first and second endwall arc segments that include a gaspath side and airfoils on the gaspath side. Each of the first and second endwall arc segments include first and second circumferential mate faces. The first circumferential mate face of the first endwall arc segment forms a joint with the second circumferential mate face of the second endwall arc segment. A cover on the gaspath side spans across at least a portion of the joint.

24 Claims, 4 Drawing Sheets

(56) References Cited

U.S. PATENT DOCUMENTS

| | | | |
|---|---|---|---|
| 4,247,259 A | 1/1981 | Saboe et al. | |
| 4,396,349 A | 8/1983 | Hueber | |
| 4,914,794 A | 4/1990 | Strangman | |
| 5,358,379 A | 10/1994 | Pepperman et al. | |
| 5,522,705 A * | 6/1996 | Elaini | F01D 5/225 |
| | | | 416/190 |
| 5,538,380 A | 7/1996 | Norton et al. | |
| 5,599,165 A * | 2/1997 | Elaini | F01D 5/225 |
| | | | 416/190 |
| 5,681,616 A | 10/1997 | Gupta et al. | |
| 5,705,231 A | 1/1998 | Nissley et al. | |
| 5,951,892 A | 9/1999 | Wolfla et al. | |
| 6,000,906 A | 12/1999 | Draskovich | |
| 6,102,656 A | 8/2000 | Nissley et al. | |
| 6,224,963 B1 | 5/2001 | Strangman | |
| 6,316,078 B1 | 11/2001 | Smialek | |
| 6,503,051 B2 * | 1/2003 | Predmore | F01D 11/005 |
| | | | 277/312 |
| 6,503,574 B1 | 1/2003 | Skelly et al. | |
| 6,514,046 B1 | 2/2003 | Morrison et al. | |
| 6,543,996 B2 | 4/2003 | Koschier | |
| 6,703,137 B2 | 3/2004 | Subramanian | |
| 6,709,230 B2 | 3/2004 | Morrison et al. | |
| 6,846,574 B2 | 1/2005 | Subramanian | |
| 7,104,756 B2 | 9/2006 | Harding et al. | |
| 7,316,539 B2 | 1/2008 | Campbell | |
| 7,326,030 B2 | 2/2008 | Albrecht et al. | |
| 7,435,058 B2 | 10/2008 | Campbell et al. | |
| 7,452,182 B2 | 11/2008 | Vance et al. | |
| 7,520,725 B1 | 4/2009 | Liang | |
| 7,670,116 B1 | 3/2010 | Wilson, Jr. et al. | |
| 7,963,745 B1 | 6/2011 | Liang | |
| 8,079,806 B2 | 12/2011 | Tholen et al. | |
| 8,182,208 B2 | 5/2012 | Bridges, Jr. et al. | |
| 8,197,211 B1 | 6/2012 | Liang | |
| 8,202,043 B2 | 6/2012 | McCaffrey | |
| 8,251,651 B2 * | 8/2012 | Propheter-Hinckley | F01D 5/284 |
| | | | 415/200 |
| 8,366,392 B1 | 2/2013 | Laing | |
| 8,480,366 B2 | 7/2013 | Malecki et al. | |
| 8,506,243 B2 | 8/2013 | Strock et al. | |
| 8,821,124 B2 | 9/2014 | Viens et al. | |
| 9,004,870 B2 * | 4/2015 | Calza | F01D 5/225 |
| | | | 416/190 |
| 9,816,379 B2 * | 11/2017 | Feldmann | F01D 5/027 |
| 2002/0187040 A1 * | 12/2002 | Predmore | F01D 11/005 |
| | | | 415/135 |
| 2008/0159850 A1 | 7/2008 | Tholen et al. | |
| 2010/0136258 A1 | 6/2010 | Strock et al. | |
| 2012/0087794 A1 * | 4/2012 | Calza | F01D 5/225 |
| | | | 416/190 |
| 2016/0090851 A1 | 3/2016 | Carr et al. | |

FOREIGN PATENT DOCUMENTS

| | | |
|---|---|---|
| EP | 1882814 | 1/2008 |
| EP | 2105579 | 9/2009 |
| EP | 2738356 | 6/2014 |
| EP | 2853688 | 4/2015 |
| GB | 2272453 | 5/1994 |
| JP | 61066802 | 4/1986 |
| JP | 05321602 | 12/1993 |

OTHER PUBLICATIONS

U.S. Appl. No. 13/429,474, filed Mar. 26, 2012.
U.S. Appl. No. 14/659,718, filed Mar. 17, 2015.
U.S. Appl. No. 14/812,668, filed Jul. 29, 2015.

* cited by examiner

ENDWALL ARC SEGMENTS WITH COVER ACROSS JOINT

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

An article according to an example of the present disclosure includes first and second endwall arc segments including a gaspath side that has a plurality of airfoils on the gaspath side. Each of the first and second endwall arc segments include first and second circumferential mate faces. The first circumferential mate face of the first endwall arc segment forms a joint with the second circumferential mate face of the second endwall arc segment. A cover on the gaspath side spans across at least a portion of the joint.

In a further embodiment of any of the foregoing embodiments, one of the airfoils is at the joint.

In a further embodiment of any of the foregoing embodiments, the cover is non-destructively removable from the first and second endwall arc segments.

In a further embodiment of any of the foregoing embodiments, the plurality of airfoils include a static airfoil and a variable airfoil.

In a further embodiment of any of the foregoing embodiments, the first mate face includes a bearing receiver and the second mate face includes a bearing hub disposed in the bearing receiver.

In a further embodiment of any of the foregoing embodiments, the cover is moveable from an initial position to an intermediate non-seated position between two of the airfoils in which the cover does not span across the joint, and the cover is rotatable from the intermediate position to a fully seated position spanning across at least a portion of the joint.

In a further embodiment of any of the foregoing embodiments, the plurality of airfoils include a variable airfoil that is rotatable in a bearing hub, and the cover includes a hub profile portion that conforms to the bearing hub.

In a further embodiment of any of the foregoing embodiments, then cover includes an airfoil profile portion and the plurality of airfoils includes a static airfoil, and the airfoil profile portion conforms to the static airfoil.

A further embodiment of any of the foregoing embodiment includes a third endwall arc segment that also has respective first and second circumferential mate faces. The second mate face of the third endwall arc segment forms a second joint with the first mate face of the second endwall arc segment, and the cover spans across a portion of the second joint.

In a further embodiment of any of the foregoing embodiments, the cover conforms with circumferentially non-consecutive ones of the airfoils.

In a further embodiment of any of the foregoing embodiments, the cover includes a first lock member and the second endwall arc segment includes a second lock member engaging the first lock member and limiting movement of the cover.

In a further embodiment of any of the foregoing embodiments, the plurality of airfoils includes a variable airfoil, and the cover is disposed radially between the variable airfoil and at least one of the first and second endwall arc segments.

In a further embodiment of any of the foregoing embodiments, the cover includes ceramic.

In a further embodiment of any of the foregoing embodiments, the plurality of airfoils include a static airfoil and a variable airfoil. The cover is moveable from an initial position to an intermediate non-seated position between two of the airfoils in which the cover does not span across the joint, and the cover is rotatable from the intermediate position to a fully seated position spanning across at least a portion of the joint.

In a further embodiment of any of the foregoing embodiments, the cover conforms with circumferentially non-consecutive ones of the airfoils, and the cover is non-destructively removable from the first and second endwall arc segments.

A gas turbine engine according to an example of the present disclosure includes a compressor section, a combustor in fluid communication with the compressor section, and a turbine section in fluid communication with the combustor. One of the turbine section or the compressor section includes an article that has first and second endwall arc segments that have a gaspath side with a plurality of airfoils on the gaspath side. Each of the first and second endwall arc segments includes first and second circumferential mate faces. The first circumferential mate face of the first endwall arc segment forms a joint with the second circumferential mate face of the second endwall arc segment. A cover on the gaspath side spans across at least a portion of the joint.

In a further embodiment of any of the foregoing embodiments, the plurality of airfoils include a static airfoil and a variable airfoil. The cover is moveable from an initial position to an intermediate non-seated position between two of the airfoils in which the cover does not span across the joint, and the cover is rotatable from the intermediate position to a fully seated position spanning across at least a portion of the joint.

In a further embodiment of any of the foregoing embodiments, the plurality of airfoils include a static airfoil and a variable airfoil, and the variable airfoil is at the joint.

An article according to an example of the present disclosure includes first, second, and third endwall arc segments that have a gaspath side that with a plurality of airfoils on the gaspath side. Each of the first, second, and third endwall arc segments includes first and second circumferential mate faces. The first circumferential mate face of the first endwall arc segment forms a first joint with the second circumferential mate face of the second endwall arc segment, and the second circumferential mate face of the second endwall arc segment forms a second joint with the first circumferential mate face of the third endwall arc segment. A cover on the gaspath side spans across at least portions of the first and second joints.

In a further embodiment of any of the foregoing embodiments, the cover includes ceramic, and the plurality of airfoils include static airfoils and variable airfoils.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
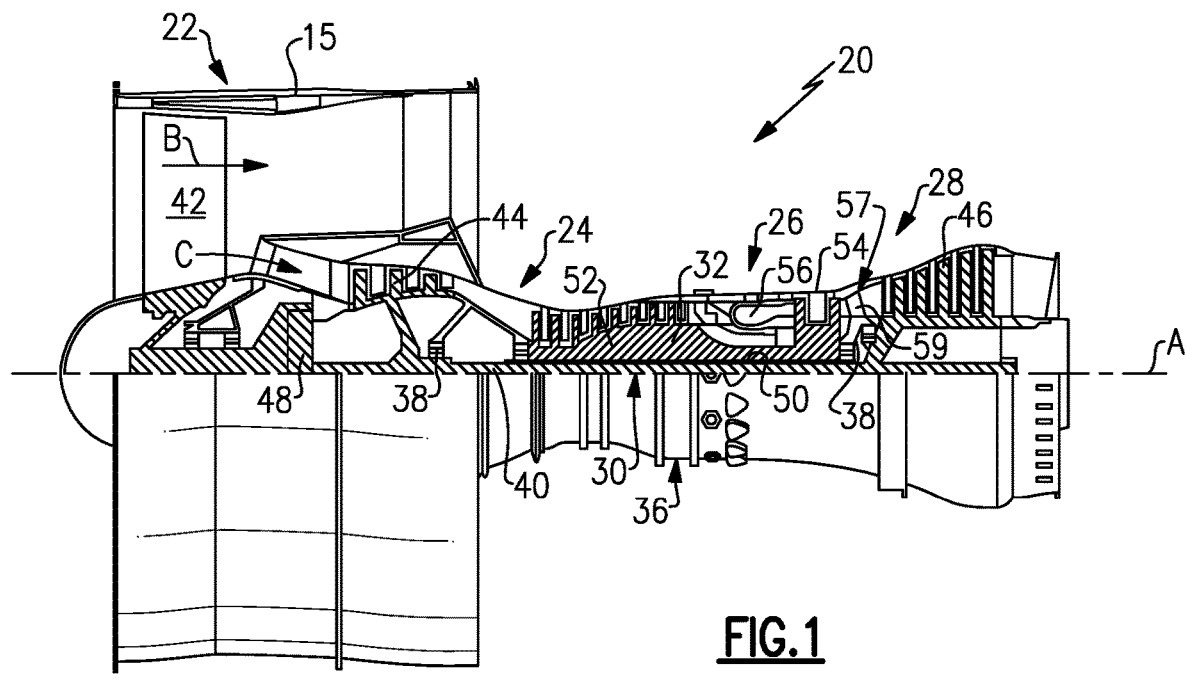
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

In gas turbine engines air is often bled from the compressor for cooling alloy components in the turbine that cannot withstand stoichiometric ideal temperatures of fuel burn; however, compressor bleed penalizes engine efficiency. Efficiency is governed by thermodynamics and mass flow through the turbine. Efficiency can generally be increased by lowering volume of compressor bleed, increasing velocity of compressor bleed, or increasing temperature of compressor bleed. These goals are challenging to meet because compressor bleed relies on the pressure differential between the compressor and the turbine. That is, the goals of lower volume, increased velocity, and increased temperature of compressor bleed are generally opposite to the goals of high pressure and low temperature compressor bleed desired for achieving good pressure differential. In this regard, to facilitate overcoming such challenges, an approach taken in this disclosure is to reduce the need for compressor bleed and cooling by enhancing the temperature resistance capability of the turbine or other components exposed to high temperatures. In particular, thermal resistance can be enhanced at the compressor exit and turbine inlet.

Figure 2:
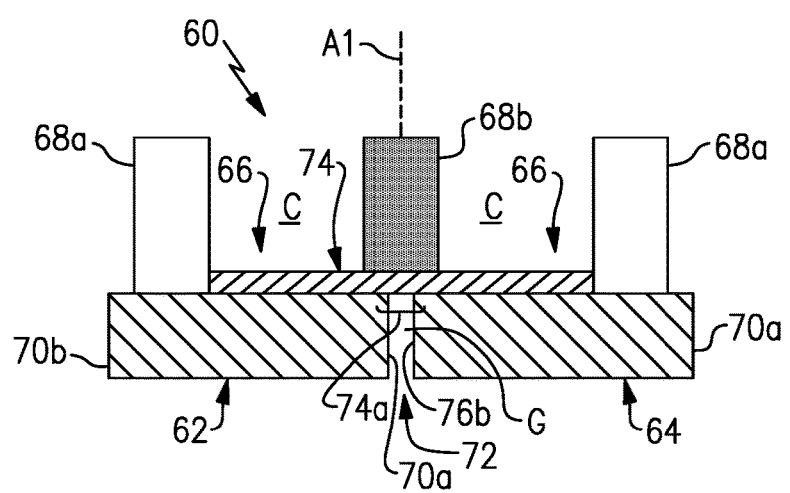
FIG. 2 illustrates an example article that has endwall arc segments and a cover that spans across a joint between the segments.

FIG. 2 illustrates selected portions of one such component, namely an article 60. For instance, the article 60 can be an annular turbine vane pack, as represented at 60a in FIG. 1, or an annular compressor vane pack, as represented at 60b in FIG. 1.

In this example, the article 60 includes first and second endwall arc segments 62/64. The endwall arc segments 62/64 form a boundary, such as the radially inner or outer boundary of the core gas path C. In this regard, the endwall arc segments 62/64 include a gaspath side 66 and a plurality of airfoils 68a/68b. For instance, the airfoils 68a are static airfoils and the airfoil 68b is a variable airfoil that is rotatable about its longitudinal axis A1.

Each of the endwall arc segments 62/64 includes first and second circumferential mate faces 70a/70b. The first circumferential mate face 70a of the first endwall arc segment 62 forms a joint 72 with the second circumferential mate face 70b of the second endwall arc segment 64. For instance, the joint 72 may be, but is not limited to, the interface region where the mate faces 70a/70b meet, the interface region where the mate faces 70a/70b abut, the interface region where the mate faces 70a/70b seal together (e.g., with a feather seal), or combinations thereof.

The article 60 further includes a cover 74 on the gaspath side 66. The cover 74 spans across at least a portion of the joint 72. For instance, portion 74a of the cover 74 bridges over the joint 72. The cover 74 may serve to protect portions of the endwall arc segments 62/64 and/or may serve to facilitate sealing of the joint 72. For instance, the joint 72 may include a gap (G) through which gas can leak. The cover 74 limits direct leakage into or from the gap (G).

The cover 74 may be formed of ceramic, to provide thermal and/or environmental resistance. The ceramic may include, but is not limited to, oxides, carbides, nitrides, borides, silicides, and combinations thereof. A ceramic is a compound of metallic or metalloid elements bonded with nonmetallic elements or metalloid elements primarily in ionic or covalent bonds. In further examples, the ceramic is a monolithic ceramic or a ceramic matrix composite (CMC). For example, a monolithic ceramic is composed of a single, homogenous ceramic material. In comparison, a composite is composed of two or more materials that are individually easily distinguishable. A CMC has a reinforcement phase, such as ceramic or carbon fibers, dispersed in a ceramic matrix formed of oxides, carbides, nitrides, borides, silicides, or combinations thereof.

In another example, the cover 74 may be coated with a thermal and/or environmental barrier ceramic coating, or a geometrically segmented coating section as discussed herein further below. As an example, the ceramic coating may include or may be oxides, carbides, nitrides, borides, silicides, or combinations thereof. In further examples, the ceramic coating may be or may include yttria stabilized with zirconia, hafnia, and/or gadolinia, gadolinia zirconate, molybdate, alumina, or combinations thereof.

Figure 3A:
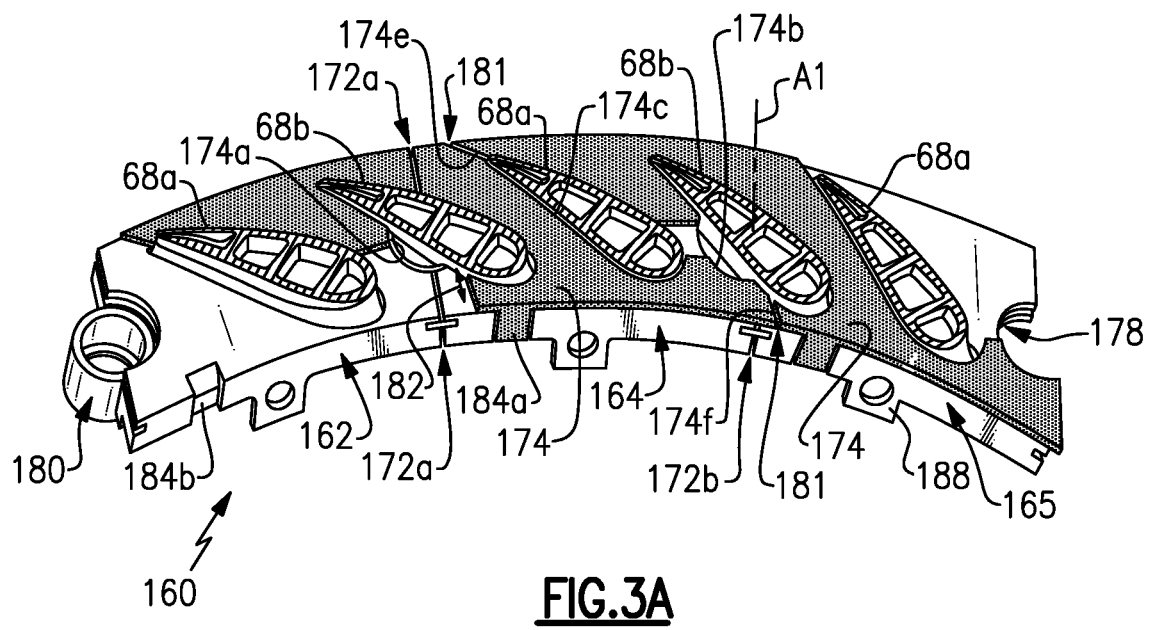
FIG. 3A illustrates another example article that has endwall arc segments and a cover that spans across several joints between the segments.
Figure 3B:
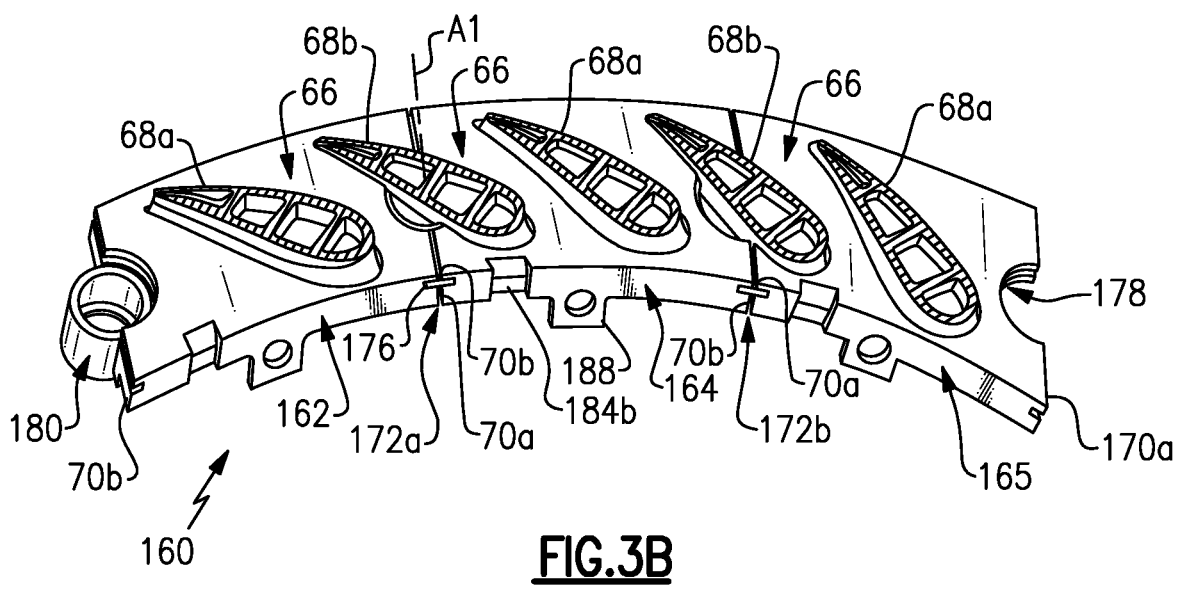
FIG. 3B illustrates the article of FIG. 3A but without the cover.

FIG. 3A illustrates another example article 160 with covers 174, and FIG. 3B illustrates the article 160 without the covers 174. In this disclosure, like reference numerals designate like elements where appropriate and reference numerals with the addition of one-hundred or multiples thereof designate modified elements that are understood to incorporate the same features and benefits of the corresponding elements. In this example, the article 160 includes first, second, and third endwall arc segments 162/164/165. The endwall arc segments 162/164/165 form a boundary, such as the radially inner boundary of the core gas path C. It is to be appreciated that the examples herein are also applicable to an outer boundary of the core gas path. The first circumferential mate faces 70a/70b form first and second joints 172a/172b. In this example, the joints 172a/172b include feather seals 176.

The static airfoils 68a may be integral with the respective endwall arc segments 162/164/165. For instance, each endwall arc segment 162/164/165 has a single static airfoil 68a. Each individual endwall arc segment 162/164/165 and its respective airfoil 68a may be cast as a single piece. As will be appreciated, the airfoils 68a may alternatively be attached or bonded to the endwall arc segments 162/164/165 rather than integral.

The variable airfoils 68b are in a circumferentially alternating arrangement with the static airfoils 68a. Thus, in terms of the circumferential row of airfoils, the static airfoils 68a are non-consecutive. The variable airfoils 68b are disposed at the joints 172a/172b. For instance, the first mate faces 170a include respective bearing receivers 178, and the second mate faces 170b include respective bearing hubs 180. In each joint 172a/172b, one bearing hub 180 is disposed in one bearing receiver 178.

The variable airfoils 68b each include a spindle (not shown) that is received in the bearing hub 180. Each variable airfoil 68b is rotatable via rotation of the spindle in the bearing hub 180 about the longitudinal axis A1 of the airfoil 68b (which is the axis of the spindle). Additionally, the variable airfoils 68b are supported by the spindles in the bearing hubs 180 such that the airfoils 68b are spaced by a clearance gap 182 from the endwall arc segments 162/164/165. The clearance gap 182 permits space for the covers 174 to fit radially between the variable airfoil 68b and the endwall arc segments 162/164/165 so that rotation of the variable airfoils 68b does not interfere with the covers 174.

The covers 174 are disposed on the gaspath side 66 of the endwall arc segments 162/164/165. As will be appreciated, although one of the covers 174 will be described, the article 160 most typically will include multiple covers 174 arranged circumferentially. The cover 174 spans across at least portions of the first and second joints 172a/172b. The cover 174 may serve to seal the joints 172a/172b, protect the endwall arc segments 162/164/165, or both. For instance, the endwall arc segments 162/164/165 may be formed of an alloy, such as a nickel- or cobalt-based alloy, and the cover 174 may be formed of a ceramic to thermally shield the endwall arc segments 162/164/165 from hot gases in the core gas path C. In some examples, cooling bleed air may be provided through the joints 172a/172b, through the endwall arc segments 162/164/165, or combinations, to cool the cover 174. In this regard, the cover 174 may include one or more cooling holes to discharge the cooling bleed air into the core gas path.

Figure 4A:
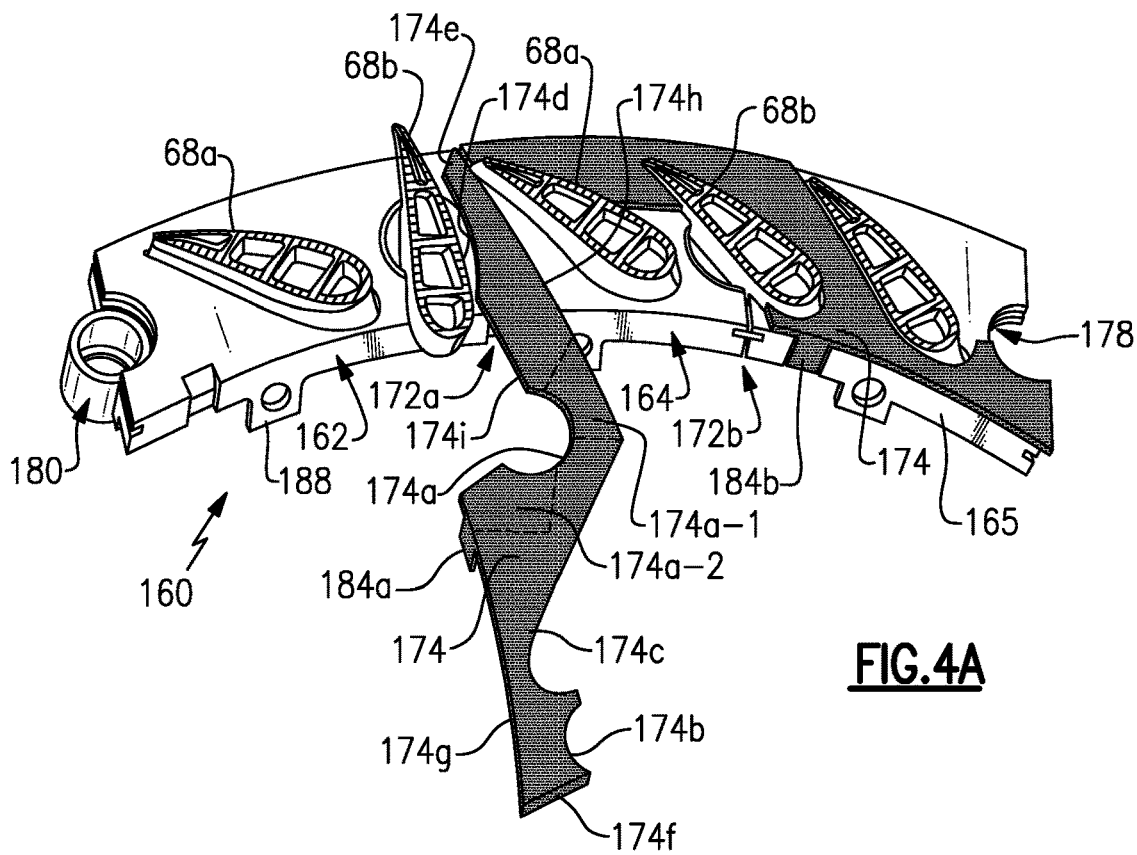
FIG. 4A illustrates the article of FIG. 3A, with the cover in an initial, non-seated position.

FIG. 4A illustrates the article 160 with one of the covers 174 in an initial, pre-assembled position. The cover 174 includes a first hub profile portion 174a, a second hub profile portion 174b, a first airfoil profile portion 174c, and a second airfoil profile portion 174d. Once seated (FIG. 3A), the hub profile portions 174a/174b conform with consecutive bearing hubs 180. In the seated position, regions 174a-1 and 174a-2 of the cover 174 around the first hub profile portion 174a are under the variable airfoil 68b, or may be under the variable airfoil 68b upon rotation. The first and second airfoil profile portions 174c/174d conform with consecutive static airfoils 68a. In this example, the first airfoil profile portion 174c conforms with a pressure side of one of the static airfoils 68a and the second airfoil profile portion 174d conforms with a suction side of a different one of the static airfoils 68a.

Each cover also includes first and second circumferential cover mate faces 174e/174f. In the seated position (FIG. 3A), the mate faces 174e/174f interface with the next adjacent covers 174 at cover joints 181. For example, the mate face 174e interfaces with the next cover 174 in the clockwise direction and the mate face 174f interfaces with the next cover 174 in the counterclockwise direction. For instance, the cover joints 181 may be the interface regions where the mate faces 174e/174f meet the next covers 174, the interface regions where the mate faces 174e/174f abut the next covers 174, the interface regions where the mate faces 174e/174f seal with the next covers 174, or combinations thereof.

The cover 174 further includes a forward edge 174g, a rear edge 174h, and an intermediate edge 174i axially between the forward and rear edges 174g/174h. The forward edge 174g joins the second circumferential cover mate face 174f and the region 174a-2. The rear edge 174h joins the first circumferential cover mate face 174e and the first airfoil profile portion 174c. The intermediate edge 174i joins the second airfoil profile portion 174d and the first hub profile portion 174a.

In this example, the forward edge 174g includes a lock member 184a. The endwall arc segments 162/164/165 include respective lock members 184b. In the fully assembled position, the lock member 184a of the cover 174 engages one of the lock members 184b, thereby limiting movement of the cover 174. For instance, the lock member 184a is a tab and the lock member 184b is a recess. The tab interlocks with the recess to limit relative movement there between. Of course, the recess could alternatively be on the cover 174 and the tab could alternatively be on the arc segments 162/164/165.

Figure 4B:
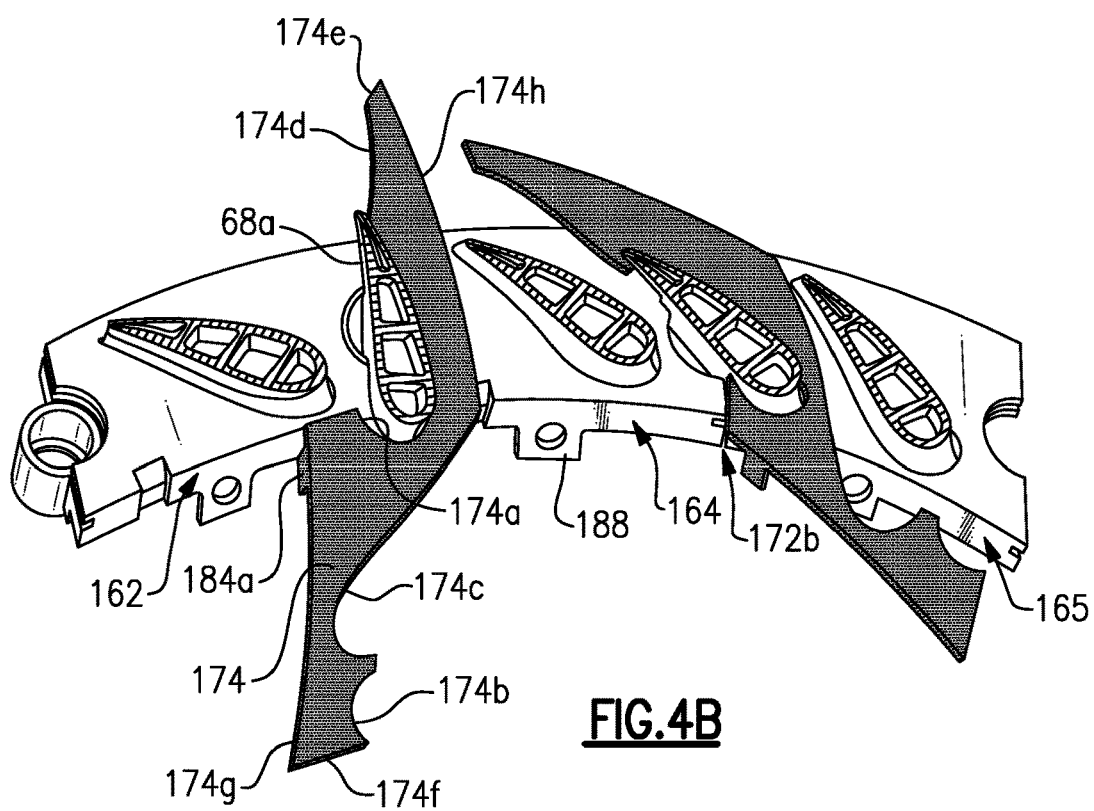
FIG. 4B illustrates the article of FIG. 3A, with the cover in an intermediate non-seated position.

FIG. 4B illustrates the cover 174 in an intermediate non-seated position. Together, FIGS. 3A, 4A, and 4B illustrate a method of installing the cover 174 in the article 160. The cover 174 is moveable from the initial position shown in FIG. 4A to the intermediate non-seated position in FIG. 4B. Generally, the terms "seated" and "non-seated" refer to the position of the cover 174 with respect to its final or near final position in the article 160. For instance, a non-seated position some, or more typically all, of the portions of the cover 174 (portions 174a-i) are displaced from the final position on the arc segments 162/164/165; and in a seated position some, or more typically all, of the portions of the cover 174 (portions 174a-i) are in the final position on the arc segments 162/164/165.

In the intermediate non-seated position, the cover 174 is between two of the airfoils 68a/68b, but the cover 174 does not span across either of the joints 172a/172b. From the intermediate non-seated position, the cover 174 is rotatable about the bearing hub 180 to a seated position (FIG. 3A) in which the cover 174 spans across at least portions of the joints 172a/172b. For instance, in the seated position, the lock members 184a/184b engage, the forward edge 174 is substantially flush with a forward edge of the arc segments 162/164/165, and the rear edge 174h is substantially flush with a rear edge of the arc segments 162/164/165. The other portions of the cover 174 are also in position to conform with the bearing hubs 180 and static airfoils 68a, as described above. Once in the seated position, another engine component or a separate ring may be used to secure the arc segments 162/164/165 together via attachment portions 188. The component or separate ring may also secure the lock members 184a/184b together by trapping the tabs in the recesses, for example. The cover 174 is non-destructively removable from the arc segments 162/164/165 by unsecuring the lock members 184a/184b, rotating the cover 174 in the opposite direction as for installation, and sliding the cover 174 out from in between the airfoils 68a/68b. For instance, the cover 174 may be removed and replaced if damaged during use.

Figure 5A:
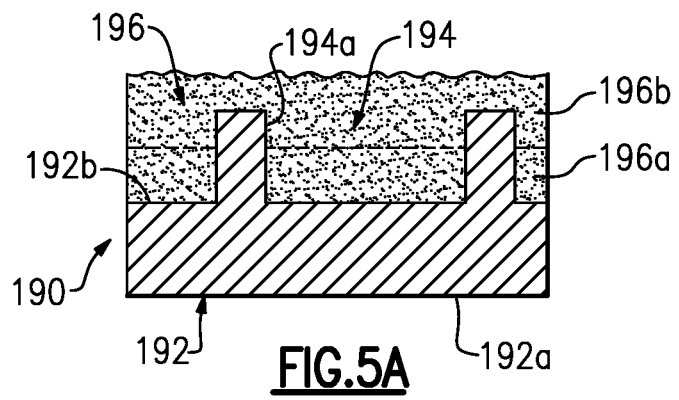
FIG. 5A illustrates a representative portion of a cover that has a geometric segmented coating section.
Figure 5B:
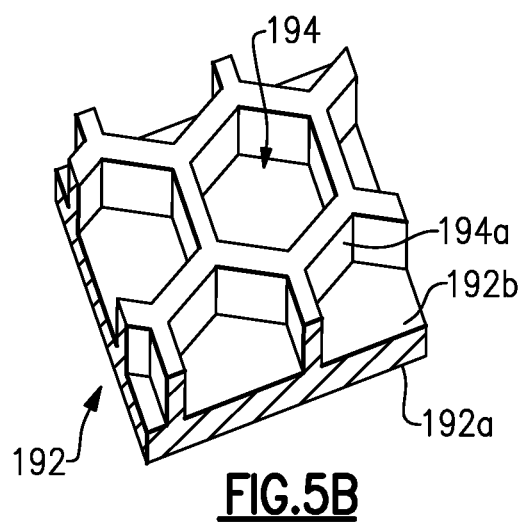
FIG. 5B illustrates a wall of the geometric segmented coating section, without the coating.

Like the cover 74, the cover 174 may be formed of ceramic and/or may be coated with a thermal and/or environmental barrier ceramic coating, to provide thermal and/or environmental resistance. Additionally or alternatively, the covers 74/174 may include a geometric segmented coating section. For instance, FIG. 5A illustrates a portion of the covers 74/174 that includes a geometric segmented coating section 190. The coating section 190 includes a metal wall 192. The metal wall 192 includes a first or inner side 192a and a second or exterior side 192b that is opposite the first side 192a. The exterior side 192b is also the exterior side exposed in the core gas path C. The second side 192b includes an array of cells 194 defined by cell sidewalls 194a. The array is a repeating geometric pattern of one or more cell geometries. In this example, the cell sidewalls 194a have a uniform thickness. As shown in the isolated view of the wall 192 in FIG. 5B, the cells 194 are hexagonal. Alternatively, the cells 194 may be circular, ovular, other polygonal geometry, or mixed cell geometries.

A coating 196 (FIG. 5A) is disposed in the array of cells 194. The cells 194 mechanically facilitate bonding of the coating 196 on the wall 192. The cells 194 thus provide good bonding and spallation resistance of the coating 196, particularly at higher temperature locations. In turn, greater spallation resistance may reduce the need for bleed air for cooling or enable use of higher temperature bleed air that is less of an efficiency penalty. The coating 196 may be a barrier coating, such as a thermal barrier or environmental barrier, which is formed of a ceramic material. The coating 196 may be a monolayer coating but more typically will be a multi-layer coating. For instance, the coating 196 has a first coating layer 196a and a second coating layer 196b. In this example, the second coating layer 196b is a topcoat.

The ceramic material of the coating 196 provides thermal and/or environmental resistance. As an example, the ceramic material may include or may be yttria stabilized with zirconia, hafnia, and/or gadolinia, gadolinia zirconate, molybdate, alumina, or combinations thereof. Additionally or alternatively, the ceramic material may include or may be a ceramic matrix composite which has a reinforcement phase, such as ceramic or carbon fibers, dispersed in a ceramic matrix formed of oxides, carbides, nitrides, borides, silicides, or combinations thereof.

The coating 196 may also include a bond coat for attaching the ceramic material to the wall 192 and cells 194. The wall 192 and cells 194 may be formed of an alloy. Example alloys may include, but are not limited to, nickel alloys, cobalt alloys, a nickel alloy coated with cobalt or cobalt alloy, or a non-nickel alloys that do not substantially react with ceramic. The bond coat may include a nickel alloy, platinum, gold, silver, or MCrAlY, where the M includes at least one of nickel, cobalt, iron, or combinations thereof.

The cell sidewalls 194a also facilitate reducing internal stresses in the coating 196 that may occur from sintering at relatively high surface temperatures during use in the engine 20. The sintering may result in partial melting, densification, and diffusional shrinkage of the coating 196 and thereby induce internal stresses. The cell sidewalls 194a serve to produce faults in at least the portion of the coating 196 above the cell sidewalls 194a. The faults provide locations for releasing energy associated with the internal stresses (e.g., reducing shear and radial stresses). That is, the energy associated with the internal stresses may be dissipated in the faults such that there is less energy available for causing delamination cracking between the coating 196 and the underlying wall 192.

The coating section 190 may be formed using several different fabrication techniques. As an example, the wall 192 may be fabricated by investment casting, additive manufacturing, brazing, or combinations thereof, but is not limited to such techniques. For instance, the cells 194 can be separately fabricated and brazed to the remaining portion of the wall 192, which can be investment cast or additively fabricated. Alternatively, the cells 194 can be formed by other techniques, such as depositing an alloy coating and removing sections of the alloy coating by machining, electro-discharge machining (EDM), or other removal process.

To produce the coating 196, ceramic coating material is deposited in the cells 194. The deposition process can include, but is not limited to, plasma spray or physical vapor deposition. In one example, plasma spray is used to produce a more durable version of the coating 196. For instance, the coating 196 has a laminar microstructure. The laminar microstructure includes grains of ceramic material that have a high aspect ratio. The laminar microstructure is a product of the plasma spray process, in which droplets of melted or partially melted ceramic material are sprayed onto the cells 194. Upon impact, the droplets flatten and solidify, yielding the laminar microstructure. There may be voids or pores among the grains; however, the coating 196 is substantially fully dense. For instance, the coating 196 has a porosity of less than 15%.

The ceramic coating material fills or substantially fills the cells 194 and is deposited in a thickness that is greater than the height of the cell sidewalls 194a. At this stage, the surface of the coating may have contours from the underlying cells 194. If such contours are undesired, the surface may be machined, ground, or abraded flat. For instance, the surface is reduced down to or close to the tops of the cell sidewalls 194a.

Figure 6:
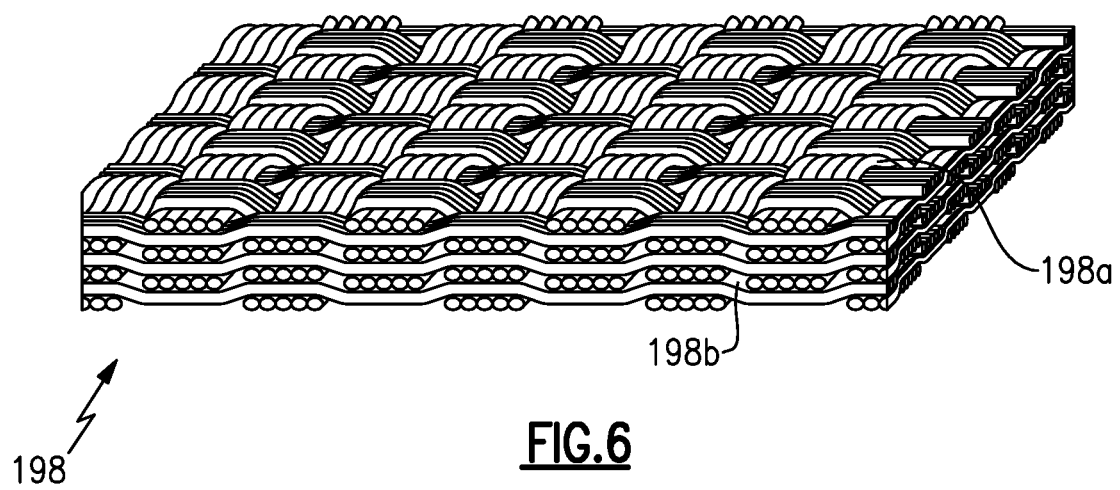
FIG. 6 illustrates a representative portion of a cover that is formed of a ceramic matrix composite.

Additionally or alternatively, the cover 74/174 or a portion thereof may be formed of a ceramic matrix composite (CMC). FIG. 6 illustrates an example CMC 198. The CMC 198 includes fibers or fiber bundles 198a disposed in a ceramic matrix 198b (between and around the fibers or fiber bundles 198a). For example, the fibers 198a are selected from ceramic fibers, carbon fibers, or combinations thereof, and the matrix 198b is selected from oxides, carbides, nitrides, borides, silicides, or combinations thereof. The fibers or bundles 198a may be monofilaments but more typically are fiber tows, wherein each tow includes a bundle of continuous filaments. A single tow may include hundreds or thousands of filaments.

The fibers or fiber bundles 198a may be woven or non-woven, but most typically are non-randomly arranged. In the illustrated example, the fibers or fiber bundles 198a are woven and include fibers or fiber bundles that are oriented in a common 0 degree direction and other fibers or fiber bundles that are oriented in a common 90 degree direction. As will be appreciated, the fibers or fiber bundles 198a could additionally or alternatively have other orientation configurations, such as but not limited to, 0/45 degrees, 0/45/90 degrees, or unidirectional (all 0 degrees).

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An article comprising:
   first and second endwall arc segments including a gaspath side having a plurality of airfoils on the gaspath side, wherein the plurality of airfoils include a static airfoil and a variable airfoil, each of the first and second endwall arc segments including first and second circumferential mate faces, the first circumferential mate face of the first endwall arc segment forming a joint with the second circumferential mate face of the second endwall arc segment; and
   a cover on the gaspath side spanning across at least a portion of the joint.

2. The article as recited in claim 1, wherein one of the airfoils is at the joint.

3. The article as recited in claim 1, wherein the cover is non-destructively removable from the first and second endwall arc segments.

4. The article as recited in claim 1, wherein the first mate face includes a bearing receiver and the second mate face includes a bearing hub disposed in the bearing receiver.

5. The article as recited in claim 1, wherein the cover is moveable from an initial position to an intermediate non-seated position between two of the airfoils in which the cover does not span across the joint, and the cover is rotatable from the intermediate position to a fully seated position spanning across at least a portion of the joint.

6. The article as recited in claim 1, wherein the variable airfoil is rotatable in a bearing hub, and the cover includes a hub profile portion that conforms to the bearing hub.

7. The article as recited in claim 6, wherein the cover includes an airfoil profile portion, and the airfoil profile portion conforms to the static airfoil.

8. The article as recited in claim 1, further comprising a third endwall arc segment that also has respective first and second circumferential mate faces, the second mate face of the third endwall arc segment forming a second joint with the first mate face of the second endwall arc segment, and the cover spans across a portion of the second joint.

9. The article as recited in claim 1, wherein the cover conforms with circumferentially non-consecutive ones of the airfoils.

10. The article as recited in claim 1, wherein the cover includes a first lock member and the second endwall arc segment includes a second lock member engaging the first lock member and limiting movement of the cover.

11. The article as recited in claim 1, wherein the cover is disposed radially between the variable airfoil and at least one of the first and second endwall arc segments.

12. The article as recited in claim 1, wherein the cover includes ceramic.

13. The article as recited in claim 12, wherein the plurality of airfoils include a static airfoil and a variable airfoil, the cover is moveable from an initial position to an intermediate non-seated position between two of the airfoils in which the cover does not span across the joint, and the cover is rotatable from the intermediate position to a fully seated position spanning across at least a portion of the joint.

14. The article as recited in claim 13, wherein the cover conforms with circumferentially non-consecutive ones of the airfoils, and the cover is non-destructively removable from the first and second endwall arc segments.

15. A gas turbine engine comprising:
a compressor section;
a combustor in fluid communication with the compressor section; and
a turbine section in fluid communication with the combustor,
at least one of the turbine section or the compressor section including an article having first and second endwall arc segments including a gaspath side having a plurality of airfoils on the gaspath side, each of the first and second endwall arc segments including first and second circumferential mate faces, the first circumferential mate face of the first endwall arc segment forming a joint with the second circumferential mate face of the second endwall arc segment, and a cover on the gaspath side spanning across at least a portion of the joint, wherein the cover is moveable from on initial position to an intermediate non-seated position between two of the airfoils in which the cover does not span across the joint, and the cover is rotatable from the intermediate position to a fully seated position spanning across at least a portion of the joint.

16. The gas turbine engine as recited in claim 15, wherein the plurality of airfoils include a static airfoil.

17. The gas turbine engine as recited in claim 15, wherein the plurality of airfoils include a static airfoil and a variable airfoil, and the variable airfoil is at the joint.

18. An article comprising:
first, second, and third endwall arc segments including a gaspath side having a plurality of airfoils on the gaspath side, each of the first, second, and third endwall arc segments including first and second circumferential mate faces, the first circumferential mate face of the first endwall arc segment forming a first joint with the second circumferential mate face of the second endwall arc segment, and the second circumferential mate face of the second endwall arc segment forming a second joint with the first circumferential mate face of the third endwall arc segment; and
a cover on the gaspath side spanning across at least portions of the first and second joints.

19. The article as recited in claim 18, wherein the cover includes ceramic, and the plurality of airfoils include static airfoils and variable airfoils.

20. An article comprising:
first and second endwall arc segments including a gaspath side having a plurality of airfoils on the gaspath side, each of the first and second endwall arc segments including first and second circumferential mate faces, the first circumferential mate face of the first endwall arc segment forming a joint with the second circumferential mate face of the second endwall arc segment;
a cover on the gaspath side spanning across at least a portion of the joint; and
a third endwall arc segment that also has respective first and second circumferential mate faces, the second mate face of the third endwall arc segment forming a second joint with the first mate face of the second endwall arc segment, and the cover spans across a portion of the second joint.

21. The article as recited in claim 20, wherein the cover includes ceramic.

22. The article as recited in claim 21, wherein the cover is moveable from an initial position to an intermediate non-seated position between two of the airfoils in which the cover does not span across the joint, and the cover is rotatable from the intermediate position to a fully seated position spanning across at least a portion of the joint.

23. The article as recited in claim 22, wherein the cover conforms with circumferentially non-consecutive ones of the airfoils, and the cover is non-destructively removable from the first and second endwall arc segments.

24. The article as recited in claim 23, wherein the cover includes an airfoil profile portion and the plurality of airfoils includes a static airfoil and a variable airfoil, and the airfoil profile portion conforms to the static airfoil.

* * * * *